United States Patent [19]
Liu

[11] Patent Number: 5,176,346
[45] Date of Patent: * Jan. 5, 1993

[54] SUCTION CUP DEVICE

[76] Inventor: Bao-Shen Liu, 3rd Fl., No. 20, Alley 6, Lane 190, Te Hsing E. Rd. Shih Lin district, Taipei, Taiwan

[*] Notice: The portion of the term of this patent subsequent to Jul. 28, 2009 has been disclaimed.

[21] Appl. No.: 709,625

[22] Filed: Jun. 3, 1991

Related U.S. Application Data

[63] Continuation-in-part of Ser. No. 654,076, Feb. 11, 1991, Pat. No. 5,133,524.

[51] Int. Cl.⁵ .............................................. F16B 47/00
[52] U.S. Cl. .............................. 248/206.1; 248/205.8; 248/362; 248/363
[58] Field of Search ............... 248/205.6, 205.7, 205.8, 248/205.9, 206.1, 362, 363, 309.3, 683

[56] References Cited

U.S. PATENT DOCUMENTS

| | | | |
|---|---|---|---|
| 2,940,713 | 6/1960 | Van Dusen | 248/205.8 |
| 4,043,531 | 8/1977 | Green | 248/205.8 X |
| 4,453,285 | 6/1984 | van Rosberg | 248/205.8 X |
| 5,029,786 | 7/1991 | Wu | 248/205.7 |
| 5,039,045 | 8/1991 | Adams et al. | 248/363 X |

FOREIGN PATENT DOCUMENTS

| | | | |
|---|---|---|---|
| 1915483 | 7/1970 | Fed. Rep. of Germany | 248/205.8 |
| 1560077 | 3/1969 | France | 248/205.8 |
| 1569052 | 5/1969 | France | 248/205.8 |
| 0699748 | 11/1953 | United Kingdom | 248/205.8 |
| 0993084 | 5/1965 | United Kingdom | 248/205.8 |

Primary Examiner—Ramon O. Ramirez
Attorney, Agent, or Firm—Ladas & Parry

[57] ABSTRACT

A sucker being diversified and/or improved and/or more endurable and/or more effective and/or convenient and/or multi-functional and/or more efficient is provided. The sucker includes a downwardly concave sucking body to be pressed against an attaching surface to vacuumize the room defined therebetween, a downwardly concave resilient member superimposed above the sucking body and having an outer periphery and a plurality of grooves not beginning from the periphery, and a connector connecting together the sucking body and the resilient member in the manner that after the sucking body has been pressed against the attaching surface, the resilient member will tend to urge the sucking body away from the attaching surface which will in turn result in that the sucking body is more securely attached to the attaching surface.

20 Claims, 7 Drawing Sheets 5,176,346

SUCTION CUP DEVICE

FIELD OF THE INVENTION

The present invention is a Continuation-in-part application of the parent application bearing the Ser. No. 07/654,076 filed Feb. 11, 1991, now U.S. Pat. No. 5,133,524, the contents of which are incorporated herewith for reference.

BACKGROUND OF THE INVENTION

The present invention relates to a sucker, and more particularly to one for daily use.

It is not seldom found that the conventional sucker fails to normally function due to factors including the deformation or the aging or the hardening of the used material and the change of the ambient temperature, moisture or atmospheric pressure, any of which probably leads to the fact that the air molecules run into the room between the sucker and the flat surface attaching thereto the sucker which explains why the sucker fails to desiredly work. To the Applicant's knowledge, the human being stands helpless before the above problem till now.

It is therefore attempted by the Applicant in a different way from the parent application to deal with the above problem encountered by the prior art.

SUMMARY OF THE INVENTION

It is therefore an object of the present invention to additionally provide a functionally and/or apparently diversified and/or more effective and/or convenient and/or longstandingly functioning sucker.

According to the present invention, a sucker includes a sucking body having a first central portion and a downwardly concave surface to be downwardly pressed against an attaching surface to vacuumize the room therebetween so that the sucking body can be attached to the attaching surface, a downwardly concave resilient member superimposed above the sucking body and having a second central portion, an outer periphery and a plurality of grooves not beginning from the periphery, and a connector connecting together the central portions in a manner that after the sucking body has been pressed against the attaching surface, the resilient member will tend to urge the sucking body away from the attaching surface which will in turn result in that the sucking body is more effectively attached to the attaching surface.

Certainly, according to such sucker structure, the resilient member can be larger or smaller than the sucking body in area.

Certainly, the resilient member and the sucking body can be generally triangular, rectangular, elliptical or circular in a top view.

Certainly, the present sucker can further include a stopper engaging with the connector for stopping thereunder the resilient member.

Certainly, the resilient member can attach thereto a hooking member.

Certainly, the connector can be integrally formed to the sucking body.

Preferably, the sucking body includes a radial extension allowing the sucking body to be easily detached from the attaching surface. Certainly, the extension can be surface-roughened to facilitate the extension to be gripped.

Certainly, the connector can be independent from and partly implanted into the sucking body, and have a threaded or a 90 degree-turnedly crosssectionally H-shaped upper portion.

Preferably, the second central portion is an opening capable of compelledly passing therethrough an upper portion of the connector.

Certainly, the grooves can be closed and have a generally sectoral or elongate or other shape.

Alternatively, the grooves can begin from the second central opening and can be generally curvy or have a generally triangular, elliptical, sectoral or other shape.

Certainly, the number of the grooves can be more than 2.

The present invention may best be understood through the following description with reference to the accompanying drawings, in which:

BRIEF DESCRIPTION OF THE DRAWING

FIG. 1-1 is a top view showing a sucker in FIG. 1;

FIG. 1-2 is a sectional view taken along the line 1-2/1-2 in FIG. 1-1;

FIG. 1-3 is a sectional view showing a sucker in FIG. 1 being pressed against a flat surface;

FIG. 1-4 is a sectional view showing a sucker in FIG. 1-3 after released;

FIG. 1-5 a sectional view showing a second preferred a sucker according to the present invention;

FIG. 2 is a top view showing a third preferred embodiment of a sucker according to the present invention;

FIG. 2-1 is a top view showing a fourth preferred embodiment of a sucker according to the present invention;

FIG. 2-2 is a sectional view showing a sucker in FIG. 2 or 2-1;

FIG. 3-FIG. 3-5 are top views respectively showing 6 different embodiments of 6 differently shaped grooves for a resilient member of a sucker according to the present invention;

FIG. 4 is a perspective view showing an eleventh embodiment of a sucker according to the present invention;

FIG. 4-1 is a top view showing a sucker in FIG. 4;

FIG. 5 is a top view showing a twelfth embodiment of a sucker according to the present invention;

FIG. 6-1 is a sectional view showing a fourteenth embodiment of a sucker according to the present invention;

FIG. 6-2 is a sectional view showing a fifteenth embodiment of a sucker according to the present invention;

FIG. 6-3 is a sectional view showing a sixteenth embodiment of a sucker according to the present invention;

DETAILED DESCRIPTION OF THE PREFERRED EMBODIMENT

Figure 1:
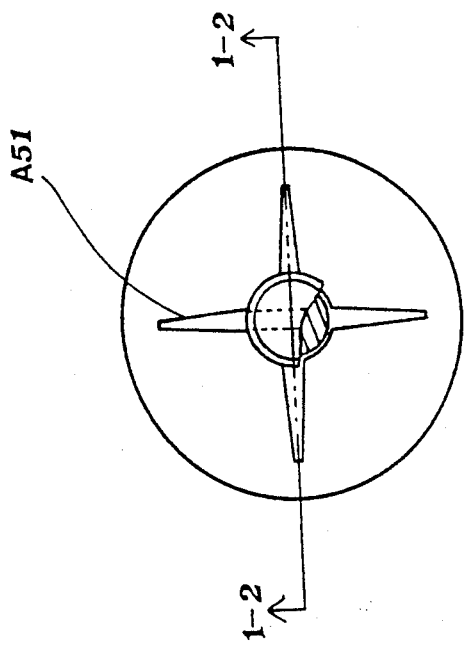
FIG. 1 is an exploded view showing a preferred embodiment of a sucker according to the present invention.
Figures 1, 2:
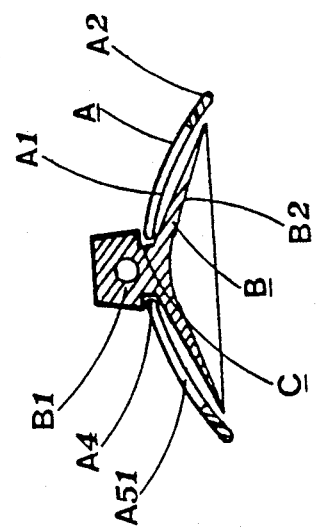
Figure 1:
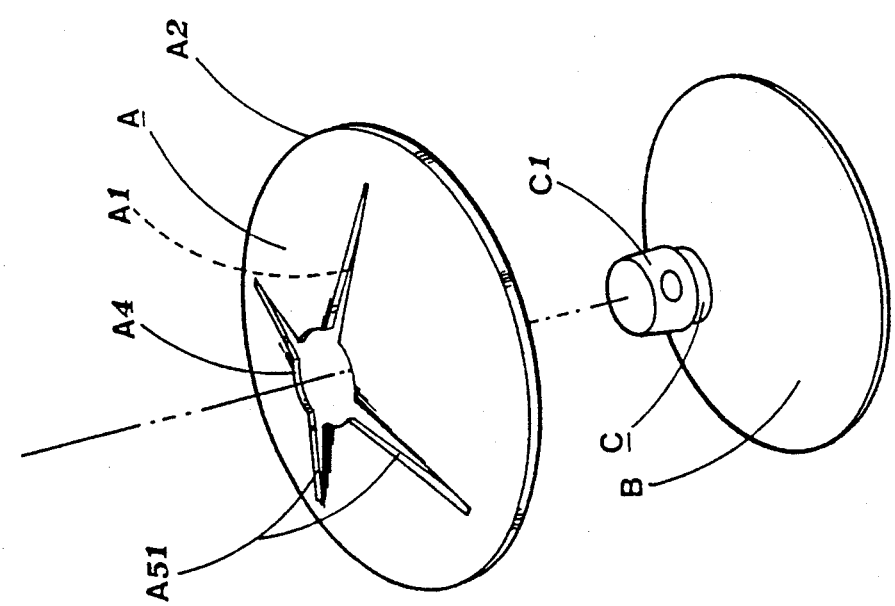
Figures 1, 2, 3:
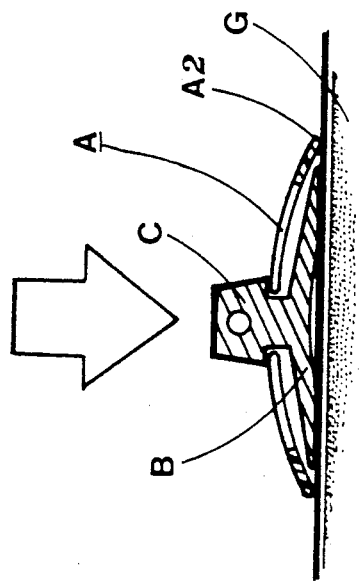
Figures 1, 2, 3, 4:
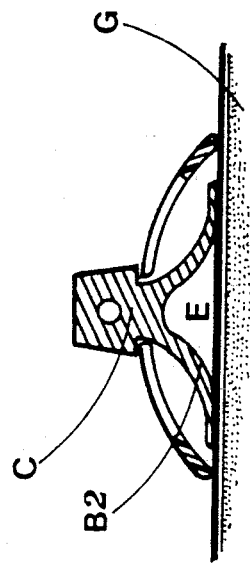

Referring now to FIG. 1–FIG. 1-4, there is shown a sucker according to the present invention which includes a sucking body B having a downwardly concave surface B2, a connector C centrally integrally formed to sucking body B and having an enlarged upper portion C1, and a resilient member A which is superimposed above sucking body B and includes a downwardly concave surface A1, an outer periphery A2, a central opening A4 capable of compelledly passing therethrough upper portion C1 to enable resilient member A to be retained by upper portion C1, and a plurality of grooves A51 beginning from central opening A4 and oriented toward outer periphery A2. In use, the present sucker is pressed against a flat attaching surface G as shown in FIG. 1-3 to discharge the air out of the room E defined between sucking body B and flat surface G to thus attach sucking body B to attaching surface G. After released, resilient member A tends to urge sucking body B away from attaching surface G as shown in FIG. 1-4 which forms a compulsive vacuum state in room E so that sucking body B is more effectively attached to attaching surface G since the air in room E gets in no way saturated no matter what the environmental temperature or atmospheric pressure may change.

As shown in FIG. 1-5, resilient member A can be smaller than sucking body B having a peripheral portion B4 in area so that periphery A2 can help urge peripheral portion B4 against attaching surface G which is advantageous in effectively preventing the environmental air from running into the room E should sucking body B have a deformation due to the change of the environmental temperature or moisture.

Alternatively, as shown in FIG. 2–FIG. 2-2, the grooves A51 can be closed. In other words, grooves A51 not only are not beginning from outer periphery A2 but also are not beginning from central opening A4. Certainly, such grooves A51 can be sectoral or elongate or have other shape. Phantom lines in FIGS. 2-1 & 2-2 schematically represent the state of resilient member A when downwardly pressed.

Figures 1, 2, 3, 4, 5:
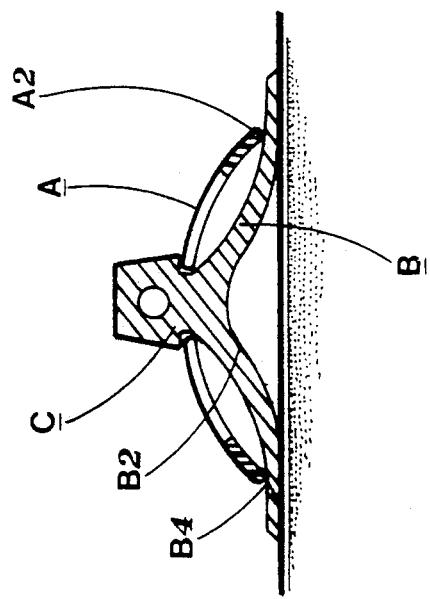
Figures 1, 2:
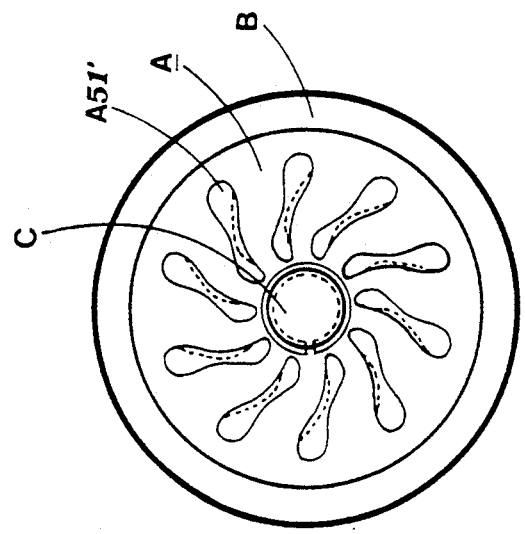
Figure 2:
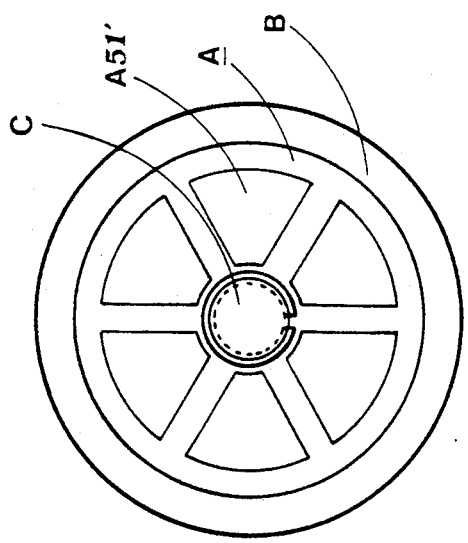
Figure 2:
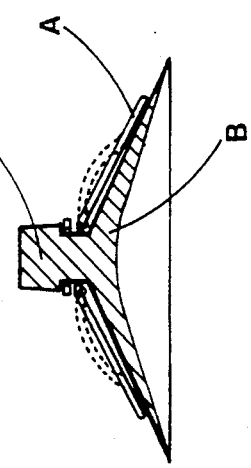
Figures 1, 3:
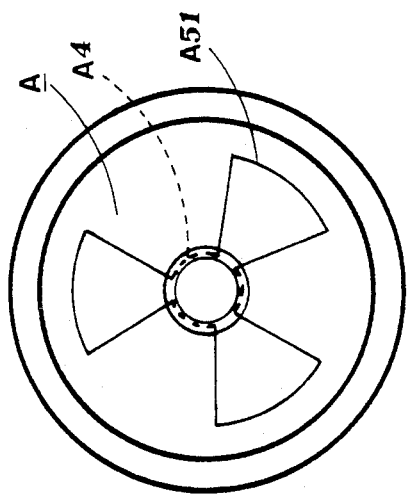
Figure 3:
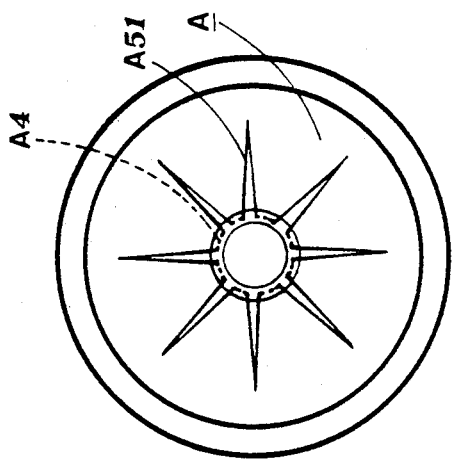
Figure 3:
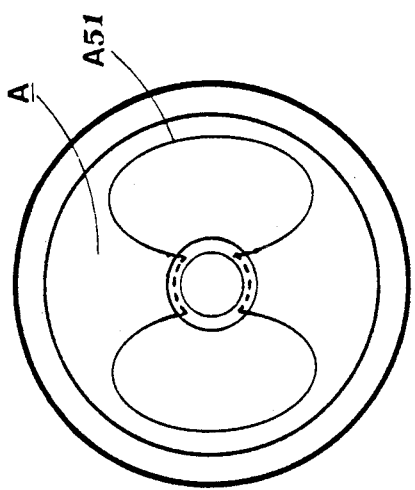
Figures 2, 3:
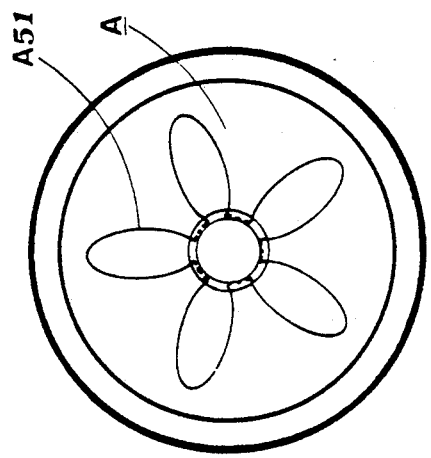
Figures 3, 4, 5:
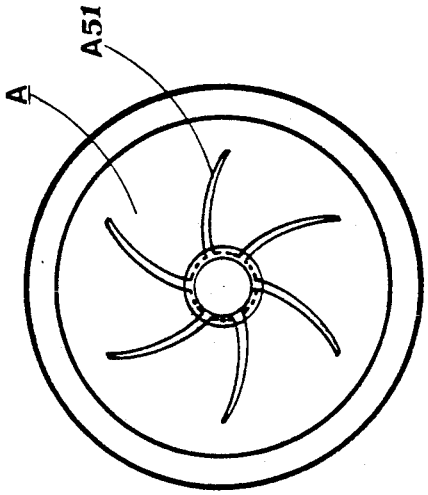
Figures 3, 4:
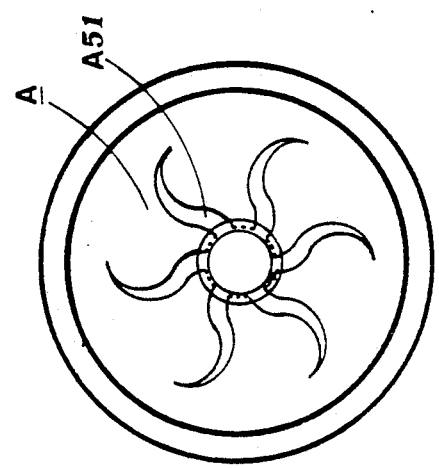
Figures 1, 4, 5:
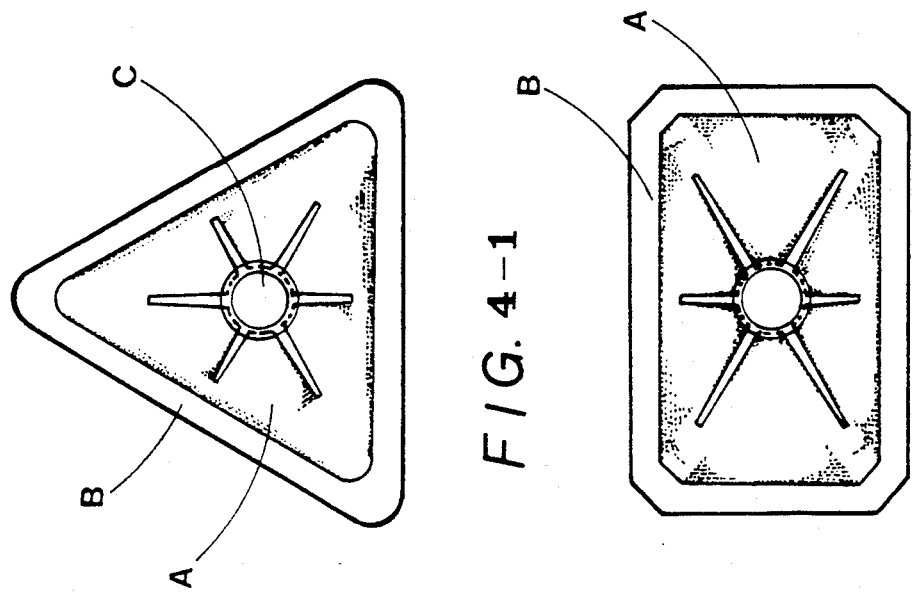
Figure 4:
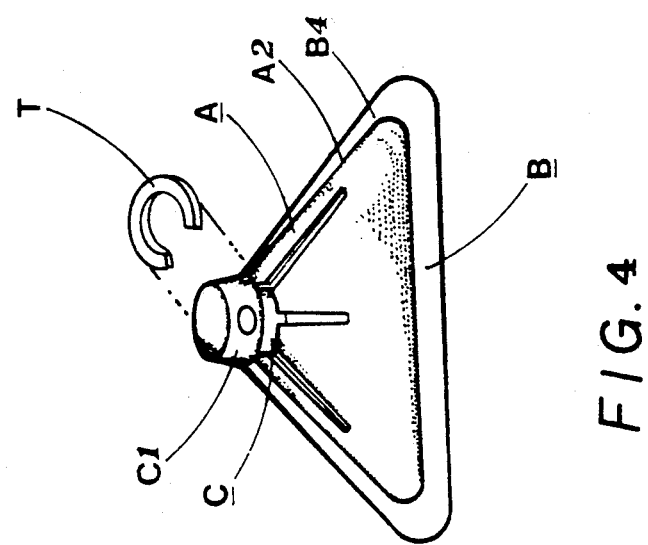

As shown in FIG. 3–FIG. 3-5, the grooves A51 can be differently shaped, e.g. generally triangularly, sectorally, elliptically, S- or curvilinearly shaped. Also, the number of grooves A51 can be desiredly varied to cope with the need of a particular situation.

As shown in FIGS. 4–5, since periphery A2 can help peripheral portion B4 to attach itself to the attaching surface G, a sucker according to the present invention can have a generally triangular or rectangular or other shape in its top view. Certainly, connector C can have the upper portion C1 thereof engage thereunder a C-shaped stopper T stopping thereunder resilient member A.

Figures 2, 6:
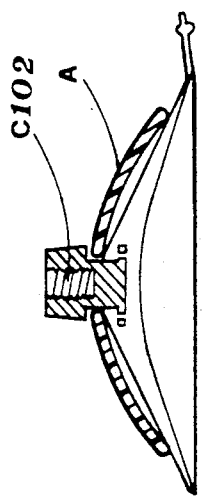
Figures 3, 6:
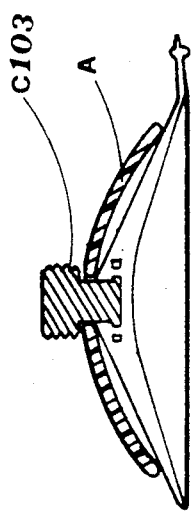

As shown in FIG. 6, connector C having a transverse through hole C101 can be independent of sucking body B but partly implanted therein during manufacturing sucking body B so that connector C can be made of a rigider material in order that a strongly resilient member A can be introduced to the present sucker since sucking body B integrally forming thereto connector C as shown in the previous examples is made of a relatively soft material so that the soft connector C tends to be deformed or damaged to fail to desiredly function if a strongly resilient member A is used. In order that the present sucker can easily be detached from the attaching surface, sucking body B is provided with a radial extension B5 capable of being upwardly pulled to allow the air to run into the room between sucking body B and the attaching surface. Certainly, extension B5 can be surface-roughened. e.g. surface-ridged at the location B51 to facilitate extension B5 to be gripped.

As shown in FIGS. 6-1, 6-2 & 6-3, the independent connector C can have an upper portion having a 90 degree-turnedly H-shaped crosssection C104, an inner thread C102 or an outer thread C103 so that connector C can easily engage thereto an article desired to be or capable of being attached to an attaching surface by a sucker. Certainly, the upper portion of connector C in these embodiments needs not be enlarged since the attached article itself might successfully serve to engage thereunder resilient member A.

Figure 7:
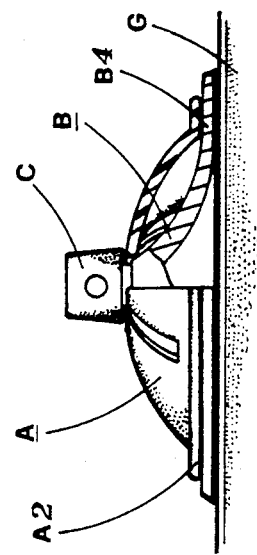
FIG. 7 is a crosssectionally front view showing a seventeenth embodiment of a sucker according to the present invention.
Figure 6:
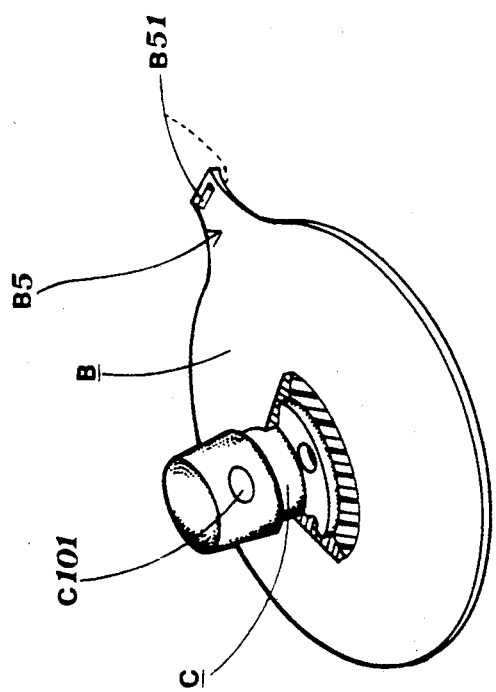
FIG. 6 is a sectionally perspective view showing a thirteenth embodiment of a sucker according to the present invention.
Figures 1, 6:
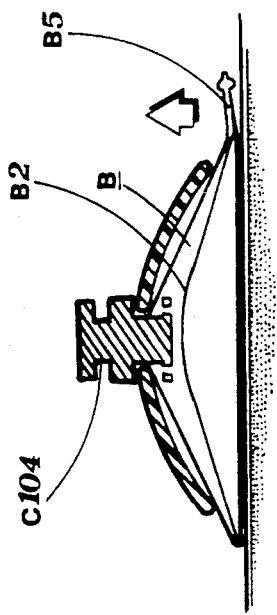

As shown in FIG. 7, periphery A2 of resilient member A can be planar so that resilient member A may more effectively or preferably engage thereunder peripheral portion B4 of sucking body B and the present sucker can be more securely attached to the attaching surface.

Figure 8:
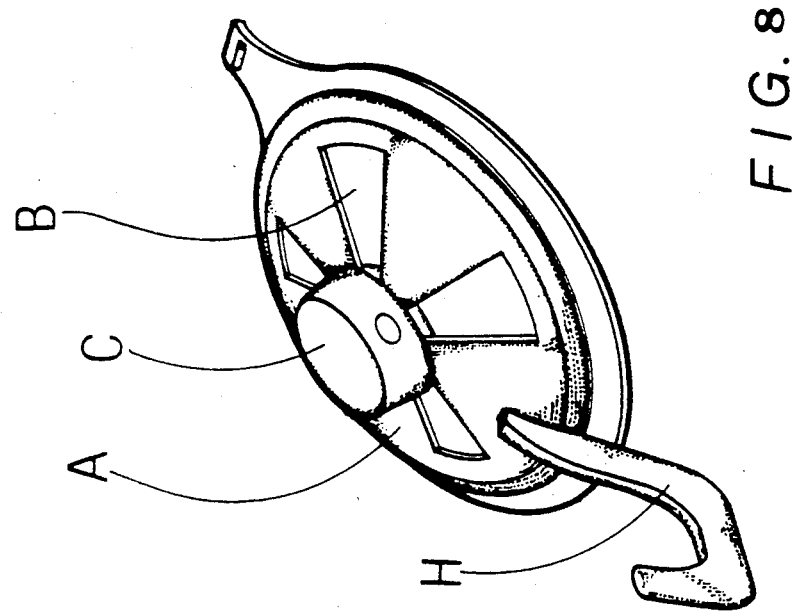
FIG. 8 is a perspective view showing an eighteenth embodiment of a sucker according to the present invention.

As shown in FIG. 8, resilient member A of the present sucker can attach thereto a hooking member H or the like so that the present sucker can hook or similarly attach thereon an article.

In sum, the advantages achieved by the present sucker can be summarized as follows:

1) The present sucker not only can be effectively attached to the attaching surface but also can be made to be detachable from the attaching surface in an easier manner.
2) Although subjected to severe atmospheric changes, the present sucker can still longstandingly work effectively.
3) Although inevitably subjected to the aging or the hardening of the used material of sucking body B, the present sucker can still longstandingly function normally.
4) The present sucker can structurally be diversified.
5) The present sucker can apparently be diversified.
6) The present sucker can functionally be diversified.
7) The engagement between the resilient member and the sucking body becomes much easier.

While the present invention has been described in connection with what are presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures reasonably deemed by those skilled in the art.

What I claim is:

1. A suction cup device comprising:
a downwardly concave sucking body having a first central portion and adapted to be downwardly pressed against an attaching surface to vacuumize a space defined between said sucking body and said attaching surface in order that said sucking body can thus be attached to said attaching surface; a downwardly concave resilient member superimposed above said sucking body, and having a second central portion, an outer periphery and a plurality of grooves spaced from said periphery; and a connector connecting together said first and second central portions in a manner that after said sucking body has been pressed against said attaching surface, said resilient member will tend to urge said sucking body away from said attaching surface which will in turn result in that said sucking body is more effectively attached to said attaching surface.

2. The suction cup device according to claim 1 wherein said resilient member is larger than said sucking body in area.

3. The suction cup device according to claim 1 wherein said resilient member is smaller than said sucking body in area.

4. The suction cup device according to claim 1 wherein said resilient member and said sucking body are generally triangular in a top view.

5. The suction cup device according to claim 1 wherein said resilient member and said sucking body are generally rectangular in a top view.

6. The suction cup device according to claim 1 wherein said resilient member and said sucking body are generally circular in a top view.

7. The suction cup device according to claim 1 further comprising a stopper engaging with said connector for stopping thereunder said resilient member.

8. The suction cup device according to claim 1 comprising a hooking member attached to said resilient member.

9. The suction cup device according to claim 1 wherein said connector is integrally formed to said sucking body.

10. The suction cup device according claim 1 wherein said sucking body includes a radial extension allowing said sucking body to be easily detached from said attaching surface.

11. The suction cup device according to claim 10 wherein said extension has a roughened surface to facilitate said extension to be gripped.

12. The suction cup device according to claim 1 wherein said connector is partly implanted into said sucking body.

13. The suction cup device according to claim 12 wherein said connector has a threaded upper portion.

14. The suction cup device according to claim 12 wherein said connector has an H-shaped vertical cross-section in its upper portion thereof.

15. The suction cup device according to claim 1 wherein said second central portion is an opening capable of passing therethrough an upper portion of said connector.

16. The suction cup device according to claim 15 wherein said grooves are closed and have a shape selected from the group consisting of generally sectoral and elongate shapes.

17. The suction cup device according to claim 15 wherein said grooves begin from said opening.

18. The suction cup device according to claim 17 wherein said grooves are generally curvy.

19. The suction cup device according to claim 17 wherein said grooves have a shape selected from the group consisting of generally triangular, elliptical and sectoral shapes.

20. The suction cup device according to claim 17 wherein the number of said grooves are more than 2.

* * * * *